United States Patent

[11] 3,622,654

[72] Inventor Kailash C. Pande
Midland, Mich.
[21] Appl. No. 702,778
[22] Filed Feb. 5, 1968
[45] Patented Nov. 23, 1971
[73] Assignee The Dow Chemical Company
Midland, Mich.

[54] METHOD FOR HYDROPHOSPHINYLATION
8 Claims, No Drawings

[52] U.S. Cl. .................................................... 260/969,
260/932, 260/940, 260/941, 260/943, 260/946,
260/968, 424/204, 424/210, 424/211, 424/212,
424/214
[51] Int. Cl. .......................................... C07f 9/40,
A01n 9/36
[50] Field of Search ............................................ 260/932,
968, 969

[56] References Cited
UNITED STATES PATENTS
3,093,672 6/1963 Miller ........................... 260/932
3,196,190 7/1965 Nischk et al. .................. 260/968 X Primary Examiner—Charles B. Parker
Assistant Examiner—Anton H. Sutto
Attorneys—Griswold and Burdick and C. E. Rehberg ABSTRACT: Activated alkenes or alkynes are hydrophosphinylated by a method comprising reacting an activated alkene or alkyne with a trialkyl phosphite in the presence of an ammonium halide so as to produce phosphonates useful in resin production. Some new phosphonates are also produced by this process which have the formula

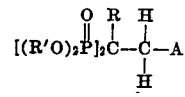

where R is hydrogen, alkyl having up to six carbon atoms or phenyl; R' is alkyl having up to twelve carbon atoms; and A is an electron-withdrawing substituent. These phosphonates have biological activity.

METHOD FOR HYDROPHOSPHINYLATION

BACKGROUND OF THE INVENTION

It is known that activated alkenes or alkynes (i.e. those containing an electron-withdrawing substituent attached to a carbon atom which has an unsaturated bond) react with trialkyl phosphites in the presence of an alcohol or phenol to give β-substituted phosphonate esters. See Harvey Tetrahedron 22, 2561 (1966). This addition reaction is termed hydrophosphinylation.

SUMMARY OF THE INVENTION

It has now been found that activated alkenes or alkynes are hydrophosphinylated by reacting said alkenes or alkynes with a trialkyl phosphite in the presence of an ammonium halide. By conducting the hydrophosphinylation reaction in the above manner, several advantages over the prior art process are realized. Reaction rates are faster, product separation is easier, straight addition products are always obtained regardless of the activating group and addition to an alkyne can result in either a completely saturated product or an alkene product depending upon the reactant ratios.

The alkene reaction equation is

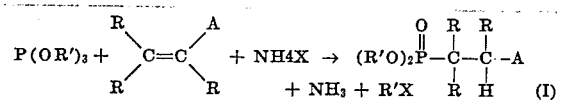

and the alkyne reaction equation is

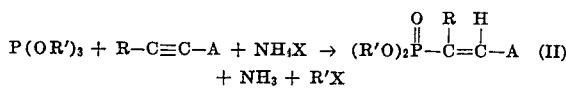

or

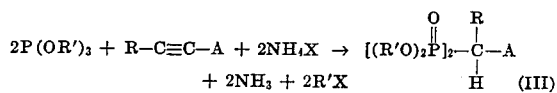

depending upon the reactant ratios employed.

In each of the above formulas, A is an electron-withdrawing substituent; each R independently is hydrogen, alkyl having up to six carbon atoms (preferably alkyl having up to three carbon atoms), or phenyl; R' is alkyl having up to twelve carbon atoms (preferably alkyl having up to eight carbon atoms); and X is chlorine, bromine, or iodine. Examples of A include the cyano (—CN), formyl (—CHO), carboxyl (—COOH), ester

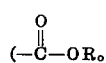

where R₀ is alkyl or aryl), amido

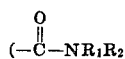

where R₁ and R₂ each independently is hydrogen, alkyl or aryl) and keto groups

where R₃ is alkyl or aryl). Thus, activated alkenes useful in this process include the acrylonitriles such as acrylonitrile and methacrylonitrile, acrylaldehydes such as acrolein and α-methylacrolein, acrylic acids such as cinnamic acid and acrylic acid, acrylic esters such as benzyl acrylate, ethyl acrylate and methyl methacrylate, acrylic amides such as acrylamide and cinnamamide, and unsaturated ketones such as methyl vinyl ketone and phenyl vinyl ketone. Similarly, activated alkynes useful in this process include the propiolonitriles such as propiolonitrile, propiolaldehydes such as propiolaldehyde, propiolic acids such as propiolic acid and phenyl-propiolic acid, propiolic esters such as ethyl propiolate, propiolic amides such as propiolamide and propiolic ketones such as methyl ehtynyl ketone. The trialkyl phosphites useful in this invention include trimethyl phosphite, triethyl phosphite, tributyl phosphite and the like.

In order to practice the invention, an activated alkene or alkyne is reacted with a trialkyl phosphite in any convenient manner in the presence of an ammonium halide (all as defined above). It is preferred to react approximately a stoichiometric amount of the three reactants, (i.e. for the alkene reaction (I), the molar ratio of the three reactants is preferably approximately one to one to one). For the alkyne reaction, the product may be either completely saturated or an alkene depending upon the reactant ratios. The preferred reactant molar ratio of approximately one to one to one will produce the alkene product (II) while the preferred molar ratio of phosphite to ammonium halide to alkyne of approximately two to two one will yield a completely saturated product (III). Wide deviation from the above mentioned molar ratios will reduce yields and lead to undesirable side reactions. Of course, the phosphonate produced in reaction equation II can also be used as as starting material for producing the completely saturated product according to the reaction

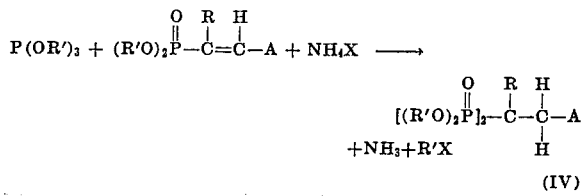

Thus, reaction equation III is a combination of reactions II and IV.

The reactions occur over a wide range of temperatures, (e.g. between 0° and 100° C.), but it is preferred to conduct the reactions at a temperature between 50° and 70° C. Atmospheric pressure is preferred but subatmospheric or superatmospheric pressures may be used. A solvent is nor necessary to our invention but one may use a solvent which is inert under the reaction conditions without substantially affecting the process. Suitable solvents include benzene, toluene, cyclohexane, heptane, methylcyclohexane, acetonitrile and dimethylformamide.

The alkene reaction products (II) are useful as starting materials for resins. They can be polymerized or copolymerized with other polymerizable, ethylenic monomers, e.g. styrene, by methods well-known in the art. The phosphonates produced in reaction equations III and IV (saturated products) are new compounds which have biological activity. They are excellent pesticides, insecticides and heribicides. These new saturated products are also useful fire retardants and extreme pressure lubricant additives.

DESCRIPTION OF SPECIFIC EMBODIMENTS

Below are specific examples of the practice of this invention. The term "ET" stands for the ethyl radical.

EXAMPLE 1

A suspension of ammonium iodide (28 g.; 0.2 mole) in a mixture of triethyl phosphite (34 g.; 0.2 mole) and acrylonitrile (14.5 g.; 0.25 mole) was heated and stirred. When the temperature reached 70° C., an exothermic reaction started and ammonia was given off. Heating and stirring was continued for an additional one to two hours (at this time all of the ammonium iodide had disappeared). On fractionation of this reaction mixture, pure 0,0-diethyl-β-cyanoethyl phosphonate was obtained. B.p., 137°/0.5 mm., yield 60 percent based on phosphite used. The product was identified by its boiling point and IR and NMR spectra.

EXAMPLE 2

A yield of 58 was obtained using the same procedure as described in example I except that NH₄Br was substituted for NH₄I.

EXAMPLE 3

A yield of 50 percent was obtained using the same procedure as described in example 1 except that NH₄Cl was substituted for NH₄I.

EXAMPLE 4

Using similar techniques and taking triethyl phosphite (0.2 mole); ethyl acrylate (0.2 mole) and ammonium iodide (0.2 mole), the adduct —

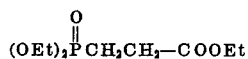

b.p. 115°/0.4 mm.
was obtained at a yield of 62 percent.

EXAMPLE 5

Addition of triethyl phosphite to methyl vinyl ketone:

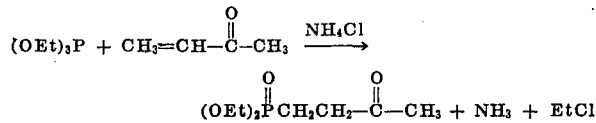

Methyl vinyl ketone (19 g.), triethyl phosphite (44.5 g.) and ammonium chloride (16 g.) were mixed and stirred at room temperature. A slight exotherm was noticed, the temperature rose to 37° C. External heat was applied and the reaction temperature was maintained at 50° C. After 6 hours, the unreacted ammonium chloride was filtered (10.5 g.). The filtrate was poured into water and extracted with methylene chloride. The extracts were dried over MgSO₄ and finally fractionated to give the desired adduct

(0,0-diethyl-2-acetylethyl phosphonate)-b.p., 125°/0.5 mm.
Yield, 40 percent.

EXAMPLE 6

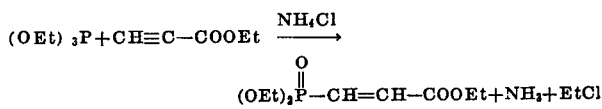

Triethyl phosphite (25 g.), ethyl propiolate (13 g.) and ammonium chloride (15 g.) were mixed and stirred. The temperature rose to 102° C. from the exothermic reaction. The mixture was stirred and maintained at 70° C. for another 3 hours. It was poured into water, extracted with methylene chloride, dried (MgSO₄) and fractionated. The vinyl phosphonate (shown above in the equation) distilled at 121°/0.4 mm. Yield 25 percent.

EXAMPLE 7

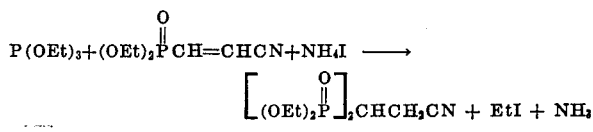

In a round-bottom flask, a mixture of triethyl phosphite (35 g.), 0,0'-diethyl -β-cyanovinyl phosphonate (40 g.), and ammonium halide (28 g.) was heated with stirring. When the temperature of the reaction mixture reached around 80° C., an exothermic reaction set in and ammonia was evolved. The reaction temperature rose to 115° C. After stirring and heating for an additional 1½ hours, the reaction mixture became clear and all of the ammonium iodide disappeared. After cooling to room temperature, the reaction product was was distilled and the pure desired product came over as a liquid at 165°-170° C./0.25 mm. The yield was 60 percent and upon analysis, 18.90 percent phosphorus was found. Calculated phosphorous was 18.93 percent.

Using a similar procedure and the appropriate starting materials, the following new phosphonates are made: tetramethyl (1-cyano-2-ethylidene)diphosphonate, tetrapropyl (1-formyl-2-ethylidene)diphosphonate, tetrahexyl (1-carboxy-2ethylidene)diphosphonate, tetraoctyl (1-(phenoxycarbonyl)-2-ethylidene)diphosphonate, tetraethyl (1-(isopropoxycarbonyl)-2-ethylidene)diphosphonate, tetradecyl (1-(dimethylcarbamoyl)-2-ethylidene)diphosphonate, tetradodecyl (1-(ethylcarbamoyl)-2-ethylidene)diphosphonate, tetrabutyl (1-(methylphenylcarbamoyl)-2-ethylidene)-diphosphonate, tetrapentyl (1-valeryl-2-ethylidene)-diphosphonate, tetraheptyl (1-benzoyl-2-ethylidene)-diphosphonate, tetramethyl (1-cyano-2-hexylidene)diphosphonate and tetrapropyl (1-formyl-2-phenethylidene)-diphosphonate.

I claim:
1. In the hydrophosphinylation of an activated unsaturated compound of the formula

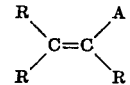

or the formula

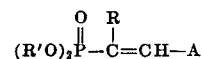

or the formula

by reaction with a trialkyl phosphite of the formula
(R'O)₃P
where in the above formulas A is an electron-withdrawing group, each R independently is H, alkyl of up to six carbon atoms or phenyl, and R' is alkyl of up to 12 carbon atoms, the improvement comprising conducting the reaction in the presence of ammonium chloride, bromide or iodide.

2. A method as defined in claim 1 wherein the temperature is between 0° and 100° C.

3. A method as defined in claim 1 wherein the temperature is between 50° and 70° C.

4. A method as defined in claim 1 wherein the molar ratios of the three reactants is approximately one to one to one.

5. A method as defined in claim 1 wherein the molar ratio of phosphite to ammonium halide unsaturated compound is approximately two to two to one.

6. The process of claim 1 wherein the activated compound has the formula II.

7. A method as defined in claim 6 wherein the temperature is between 0° and 100° C.

8. The process of claim 1 wherein the unsaturated compound is acrylonitrile, ethyl acrylate, methyl vinyl ketone or 0,0'-diethyl-β-cyanovinyl phosphonate.

* * * * *

UNITED STATES PATENT OFFICE
CERTIFICATE OF CORRECTION

Patent No. 3,622,654      Dated 23 November 1971

Inventor(s) Kailash C. Pande

It is certified that error appears in the above-identified patent and that said Letters Patent are hereby corrected as shown below:

In column 1, change the formula between lines 35 and 40 to:

$$2P(OR')_3 + R-C\equiv C-A + 2NH_4X \rightarrow [(R'O)_2 \overset{O}{\underset{\|}{P}}]_2 - \underset{H}{\overset{R}{\underset{|}{C}}} - \overset{H}{\underset{|}{C}} - A \quad (III)$$
$$+ 2 NH_3 + 2 R'X$$

In column 2, line 21, delete "two one" and insert -- two to one --.

In column 3, line 10, change "58" to -- 58% --; change the formula at line 36 to:

-- $(OEt)_3P + CH_2=CH-\overset{O}{\underset{\|}{C}}-CH_3$ --

In column 4, line 66 insert -- to -- between "halide" and "unsaturated".

Signed and sealed this 13th day of June 1972.

(SEAL)
Attest:

EDWARD M. FLETCHER, JR.
Attesting Officer

ROBERT GOTTSCHALK
Commissioner of Patents